US010112588B2

(12) United States Patent
Inomata

(10) Patent No.: US 10,112,588 B2
(45) Date of Patent: Oct. 30, 2018

(54) VEHICLE CONTROL APPARATUS

(71) Applicant: Toyota Jidosha Kabushiki Kaisha, Toyota-shi, Aichi-ken (JP)

(72) Inventor: Ryo Inomata, Ashigarakami-gun Kanagawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 172 days.

(21) Appl. No.: 15/324,547

(22) PCT Filed: Jul. 2, 2015

(86) PCT No.: PCT/JP2015/069709
§ 371 (c)(1),
(2) Date: Jan. 6, 2017

(87) PCT Pub. No.: WO2016/006643
PCT Pub. Date: Jan. 14, 2016

(65) Prior Publication Data
US 2017/0151937 A1 Jun. 1, 2017

(30) Foreign Application Priority Data
Jul. 11, 2014 (JP) .................................. 2014-143531

(51) Int. Cl.
*B60T 8/1755* (2006.01)
*B60T 7/22* (2006.01)
(Continued)

(52) U.S. Cl.
CPC ............ *B60T 8/17558* (2013.01); *B60T 7/22* (2013.01); *B60T 8/58* (2013.01);
(Continued)

(58) Field of Classification Search
CPC .......... B60T 8/17558; B60T 8/58; B60T 7/22; B60T 2270/40; B60T 2201/022; B60T 2201/024; B60W 2030/082
(Continued)

(56) References Cited

U.S. PATENT DOCUMENTS

| 2005/0071071 A1* | 3/2005 | Nagata ................... B60K 28/14 701/70 |
| 2012/0004819 A1 | 1/2012 | Lu et al. |
| 2013/0253792 A1* | 9/2013 | Hammoud ................ B60T 7/22 701/70 |

FOREIGN PATENT DOCUMENTS

| JP | 2005-254943 | * | 9/2005 |
| JP | 2005-254943 A | | 9/2005 |

(Continued)

*Primary Examiner* — Muhammad Shafi
(74) *Attorney, Agent, or Firm* — Dinsmore & Shohl LLP

(57) ABSTRACT

A vehicle control apparatus includes a collision detection unit configured to detect that a vehicle collides against an object outside the vehicle, a brake control unit configured to carry out a post-collision brake control for automatically braking the vehicle when the collision detection unit detects the collision, and a prediction unit configured to predict a yaw generation probability which is a degree of generation of yaw generated to the vehicle when the post-collision brake control is carried out, based on a collision direction and a collision position of the vehicle with respect to the object outside the vehicle, after the collision has been detected by the collision detection unit and before the post-collision brake control is carried out by the brake control unit.

4 Claims, 7 Drawing Sheets

(51) Int. Cl.
*B60T 8/58* (2006.01)
*B60W 30/08* (2012.01)

(52) U.S. Cl.
CPC ... *B60T 2201/022* (2013.01); *B60T 2201/024* (2013.01); *B60T 2270/40* (2013.01); *B60W 2030/082* (2013.01)

(58) Field of Classification Search
USPC .......................................................... 701/70
See application file for complete search history.

(56) References Cited

FOREIGN PATENT DOCUMENTS

| | | |
|---|---|---|
| JP | 2007-145313 A | 6/2007 |
| JP | 2011-126436 A | 6/2011 |

\* cited by examiner

FIG.4

| COLLISION POSITION | COLLISION DIRECTION | COMBINATION OF FAILED WHEEL(S) THAT MAY NOT BE BRAKED DUE TO FAILURE | WHETHER OR NOT YAW GENERATION PROBABILITY OCCURS DUE TO BRAKE CONTROL AFTER COLLISION |
|---|---|---|---|
| 1 | FRONT-BACK | FR WHEEL | OCCURS |
| 1 | FRONT-BACK | FR WHEEL, RL WHEEL | OCCURS |
| 1 | FRONT-BACK | FR WHEEL, FL WHEEL | DOES NOT OCCUR |
| 2 | RIGHT-LEFT | FR WHEEL | OCCURS |
| 2 | RIGHT-LEFT | FR WHEEL, RL WHEEL | OCCURS |
| 2 | RIGHT-LEFT | FR WHEEL, FL WHEEL | DOES NOT OCCUR |
| 3 | RIGHT-LEFT | RR WHEEL | OCCURS |
| 3 | RIGHT-LEFT | RR WHEEL, FL WHEEL | OCCURS |
| 3 | RIGHT-LEFT | RR WHEEL, RL WHEEL | DOES NOT OCCUR |
| 4 | FRONT-BACK | RR WHEEL | OCCURS |
| 4 | FRONT-BACK | RR WHEEL, FL WHEEL | OCCURS |
| 4 | FRONT-BACK | RR WHEEL, RL WHEEL | DOES NOT OCCUR |
| 5 | FRONT-BACK | RL WHEEL | OCCURS |
| 5 | FRONT-BACK | RL WHEEL, FR WHEEL | OCCURS |
| 5 | FRONT-BACK | RL WHEEL, RR WHEEL | DOES NOT OCCUR |
| 6 | RIGHT-LEFT | RL WHEEL | OCCURS |
| 6 | RIGHT-LEFT | RL WHEEL, FR WHEEL | OCCURS |
| 6 | RIGHT-LEFT | RL WHEEL, RR WHEEL | DOES NOT OCCUR |
| 7 | RIGHT-LEFT | FL WHEEL | OCCURS |
| 7 | RIGHT-LEFT | FL WHEEL, RR WHEEL | OCCURS |
| 7 | RIGHT-LEFT | FL WHEEL, FR WHEEL | DOES NOT OCCUR |
| 8 | FRONT-BACK | FL WHEEL | OCCURS |
| 8 | FRONT-BACK | FL WHEEL, RR WHEEL | OCCURS |
| 8 | FRONT-BACK | FL WHEEL, FR WHEEL | DOES NOT OCCUR |

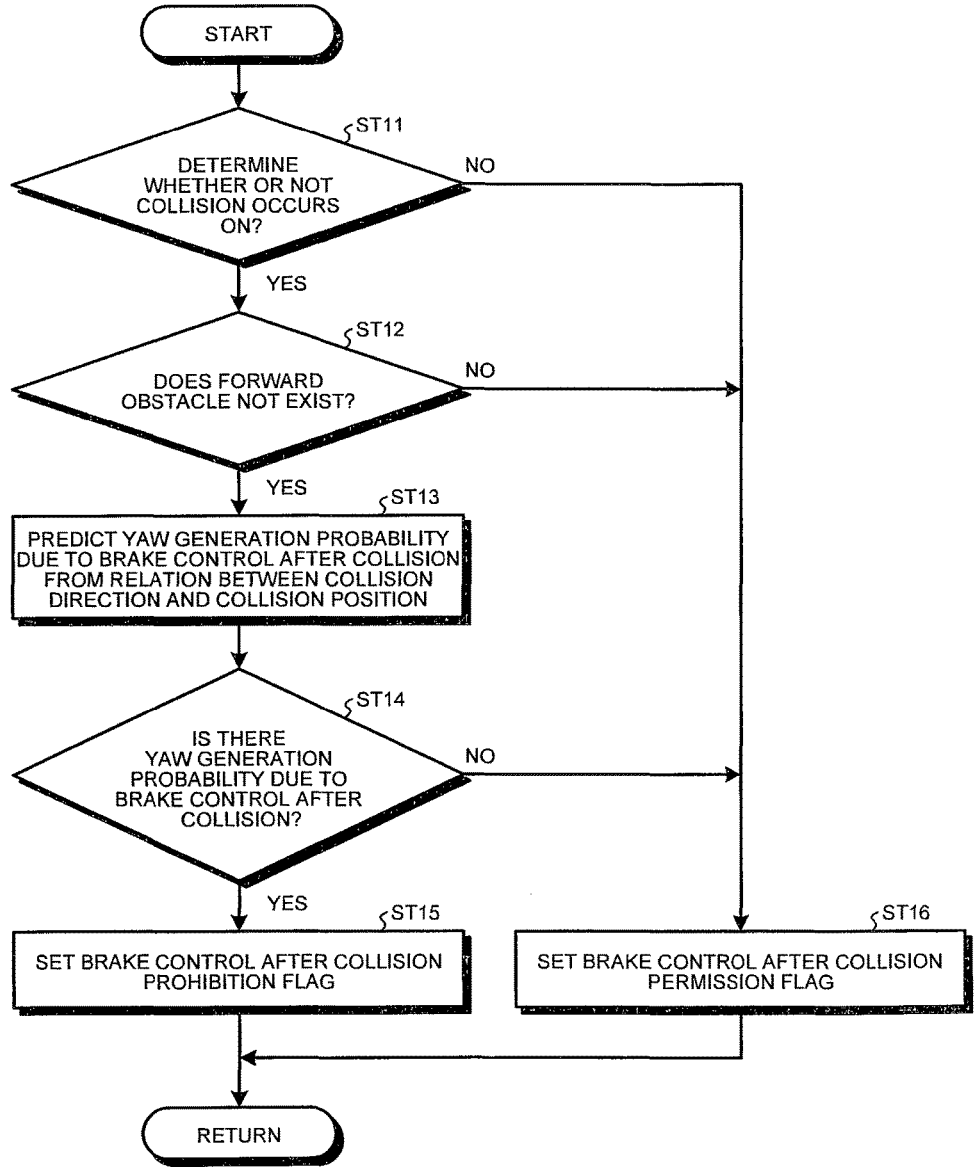

VEHICLE CONTROL APPARATUS

CROSS-REFERENCE TO RELATED APPLICATIONS

This application is a National Stage of International Application PCT/JP2015/069709 filed on Jul. 2, 2015, which claims priority to Japanese Patent Application No. 2014-143531, filed Jul. 11, 2014, the entire contents of which are hereby incorporated by reference.

TECHNICAL FIELD

The present disclosure relates to a vehicle control apparatus.

BACKGROUND ART

Conventionally, vehicle control apparatuses, which carry out a vehicle control after a collision occurs have been reported for the purpose of reducing multiple accidents. As an example of the conventional vehicle control apparatuses, Patent Literature 1 discloses a vehicle control apparatus for automatically carrying out, when a collision is detected, a brake control until a driver's own vehicle speed becomes 0. Further, Patent Literature 2 discloses a vehicle control apparatus for carrying out a brake control for reducing a vehicle speed after a collision occurs, when a region, in which it is assumed that a spin amount or a yaw rate generated by the collision is small, becomes a collision position, and otherwise carrying out a vehicle stabilization control.

CITATION LIST

Patent Literatures

Patent Literature 1 Japanese Laid-open Patent Publication No. 2007-145313
Patent Literature 2 Japanese Laid-open Patent Publication No. 2011-126436

SUMMARY

Incidentally, in the conventional vehicle control apparatuses (Patent Literature 1, etc.), a risk, which is caused by a failure of a brake system due to collision and by a brake control carried out when the brake system fails, is not assumed. Thus, in the conventional vehicle control apparatuses, there is a fear that yaw is generated by a post-collision brake control, which is a brake control for automatically braking a vehicle after a collision occurs, depending on a collision position and a failed portion.

An example, which illustrates how a yaw moment is generated when a brake control is carried out in a state that a brake system fails, will be explained referring to FIG. 1. For example, as illustrated in FIG. 1, when the post-collision brake control is carried out at the time the brake system has failed after a collision, since braking is carried out in a right/left asymmetric state, the yaw moment is generated. FIG. 1(a) illustrates a state that a collision occurs at a front right position of a side surface of a vehicle and a front right wheel cannot be braked. When the post-collision brake control is carried out in the state, since only three wheels, i.e. a front left wheel, a rear right wheel, and a rear left wheel are braked, yaw is generated in a counterclockwise direction because the braking is carried out in the right/left asymmetric state. Further, FIG. 1(b) illustrates a state that a collision occurs at a rear left position of a side surface of a vehicle including a brake system with an X-shaped two-piping system and a rear left wheel and a front right wheel cannot be braked. When the post-collision brake control is carried out in the state, since only two wheels, i.e. a front left wheel and a rear right wheel are also braked, yaw is generated in the counterclockwise direction because the braking is carried out in the right/left asymmetric state.

Further, when yaw is generated by the post-collision brake control, there is a high probability that an amount of lateral movement of a vehicle increases after a collision arises. Further, when the amount of lateral movement of the vehicle increases, there is a high probability that a secondary collision, by which the vehicle collides against a road side object and an oncoming vehicle due to a deviation of the vehicle beyond its lane, occurs. Thus, in the conventional vehicle control apparatuses, when yaw is generated by the post-collision brake control, since there is a high probability that the secondary collision occurs due to the deviation of the vehicle beyond its lane, there is room for improving safety when the brake control is carried out.

An object of the disclosure, which was made in view of the circumstances, is to provide a vehicle control apparatus capable of reducing a probability of generation of yaw due to the post-collision brake control.

A vehicle control apparatus according to the present disclosure includes a collision detection unit configured to detect that a vehicle collides against an object outside the vehicle; a brake control unit configured to carry out a post-collision brake control for automatically braking the vehicle when the collision detection unit detects the collision; and a prediction unit configured to predict a yaw generation probability which is a degree of generation of yaw generated to the vehicle when the post-collision brake control is carried out, based on a collision direction and a collision position of the vehicle with respect to the object outside the vehicle, after the collision has been detected by the collision detection unit and before the post-collision brake control is carried out by the brake control unit. Here, when the yaw generation probability predicted by the prediction unit is high, the brake control unit suppresses to carry out the post-collision brake control in comparison with a case that the yaw generation probability is low.

Further, in one embodiment, the prediction unit predicts a failed wheel which may not be braked from a combination of the collision direction and the collision position of the vehicle with respect to the object outside the vehicle, and predicts whether or not the yaw generation probability occurs according to a position of the failed wheel having been predicted.

Further, in another embodiment, when the yaw generation probability is not predicted by the prediction unit, the brake control unit carries out the post-collision brake control, whereas when the yaw generation probability is predicted by the prediction unit, the brake control unit prohibits the post-collision brake control without carrying out the post-collision brake control.

Further, in another embodiment, when the yaw generation probability is not predicted by the prediction unit, the brake control unit carries out the post-collision brake control, whereas when the yaw generation probability is predicted by the prediction unit, the brake control unit carries out a yaw suppression brake control for automatically braking the vehicle by generating a brake force smaller than the brake force generated by the post-collision brake control.

When yaw is increased by the post-collision brake control, since the vehicle control apparatus according to the disclosure suppresses to carry out the post-collision brake control, the vehicle control apparatus can suppress an increase of yaw. As described above, since the vehicle control apparatus according to the disclosure can reduce the probability of generation of yaw due to the post-collision brake control, the probability of the secondary collision against a road side object and an oncoming vehicle due to the deviation of the vehicle beyond its lane can be also reduced. As a result, there can be achieved an effect that a safety can be improved when the brake control is carried out.

BRIEF DESCRIPTION OF DRAWINGS

FIG. 4 is a table illustrating a list of the combinations of collision directions and collision positions where yaw tends to be generated by a brake control after collision according to the embodiment.

FIG. 5 is a flowchart illustrating an example of a brake control suppression process after collision carried out by the vehicle control apparatus according to the embodiment.

DETAILED DESCRIPTION

An embodiment of the disclosure will be explained below in detail based on the drawings. Note that the disclosure is not restricted by the embodiment. Further, components in the embodiment include the components that can be easily replaced by a person skilled in the art and are easy, or substantially the same components.

Embodiment

Figure 1:
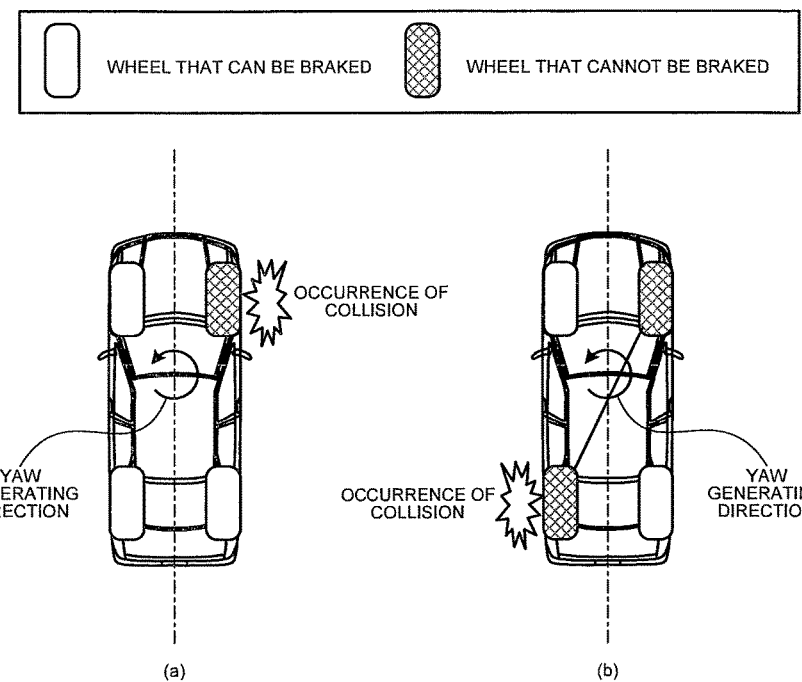
FIG. 1 is a view illustrating examples how yaw moment is generated when a brake control is carried out in a state that a brake system fails.
Figure 2:
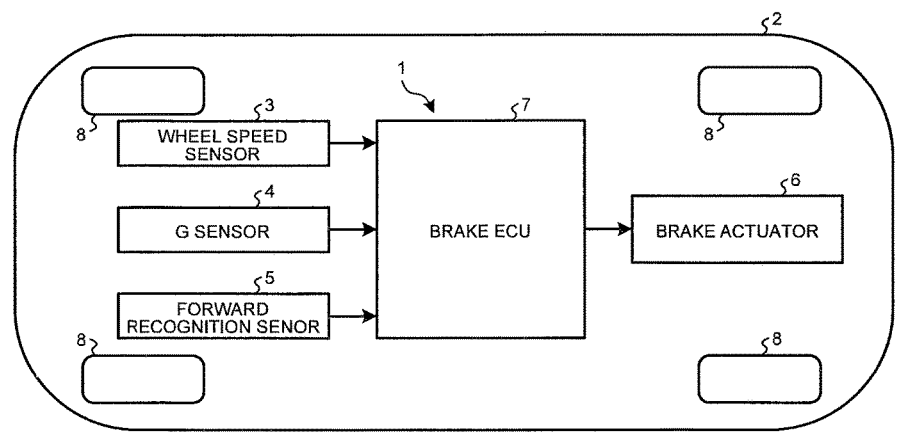
FIG. 2 is a schematic configuration view illustrating a vehicle control apparatus according to an embodiment.
Figure 3:
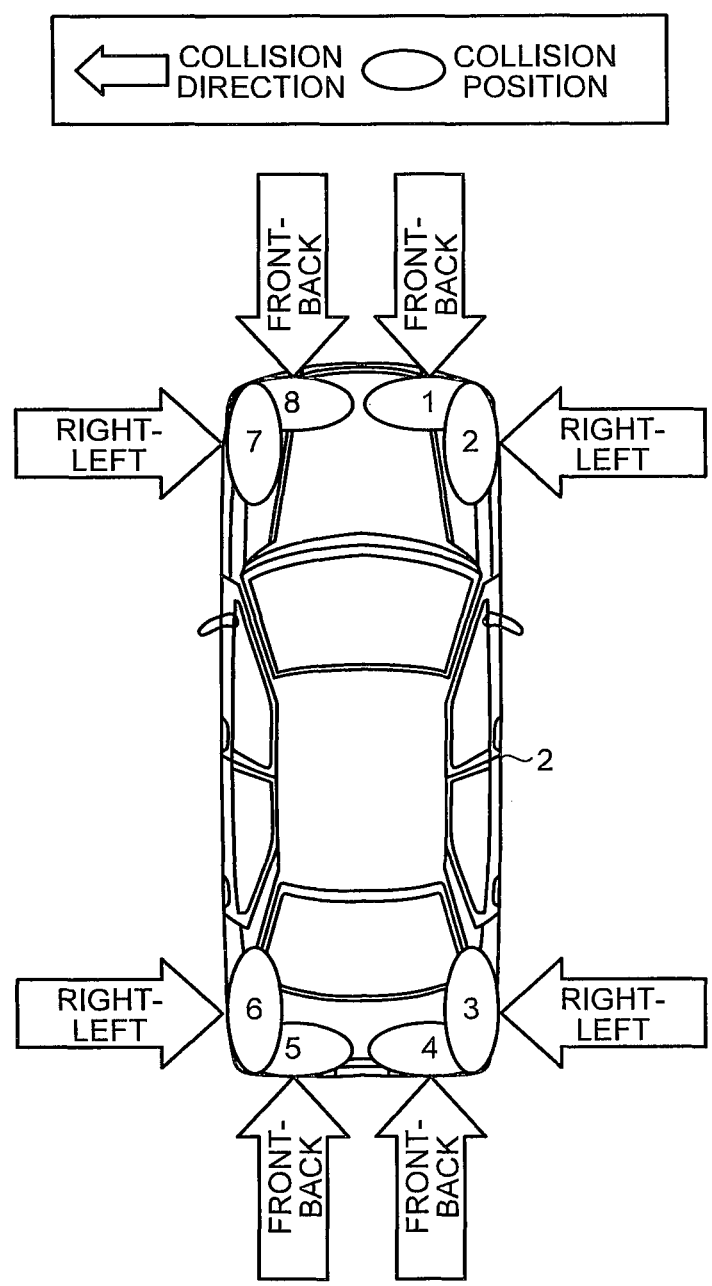
FIG. 3 is a view illustrating an example of a collision direction and a collision position of an object outside the vehicle according to the embodiment.
Figure 6:
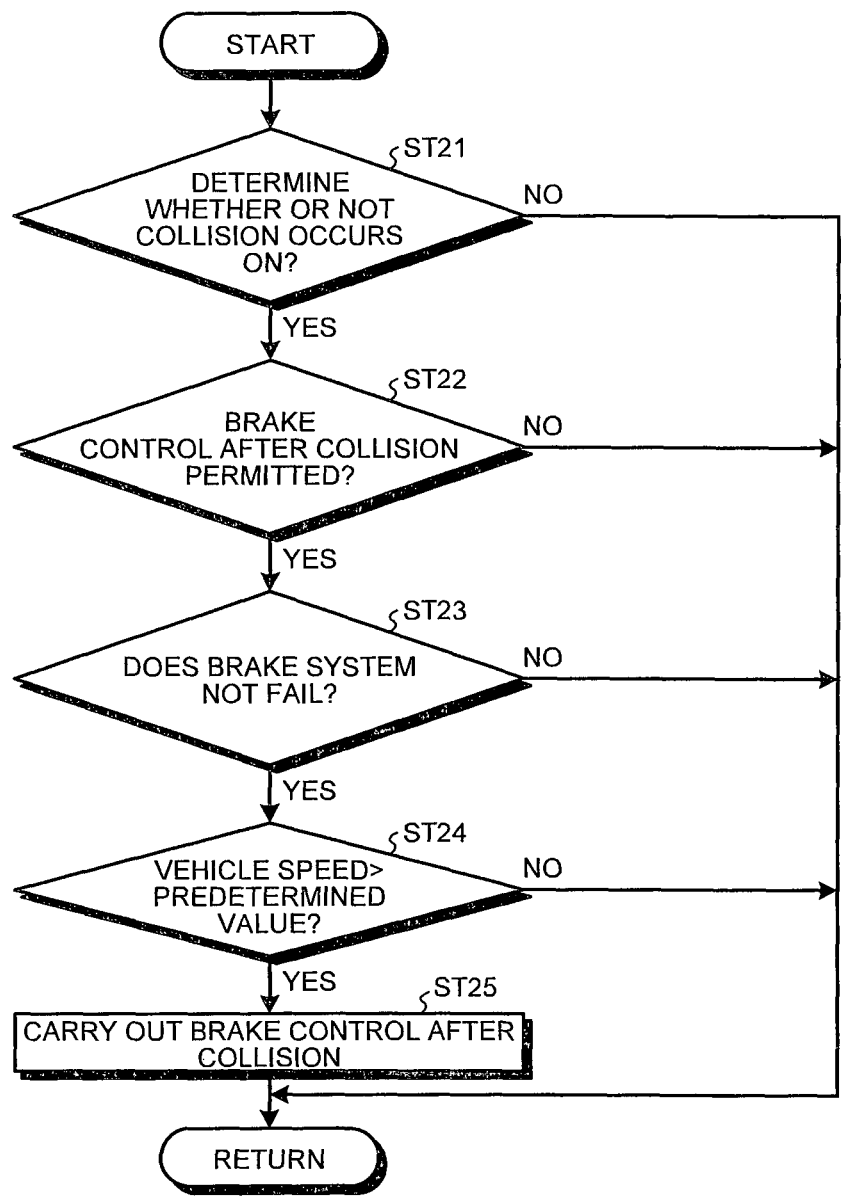
FIG. 6 is a flowchart illustrating an example of the brake control suppression process after collision carried out by the vehicle control apparatus according to the embodiment.
Figure 7:
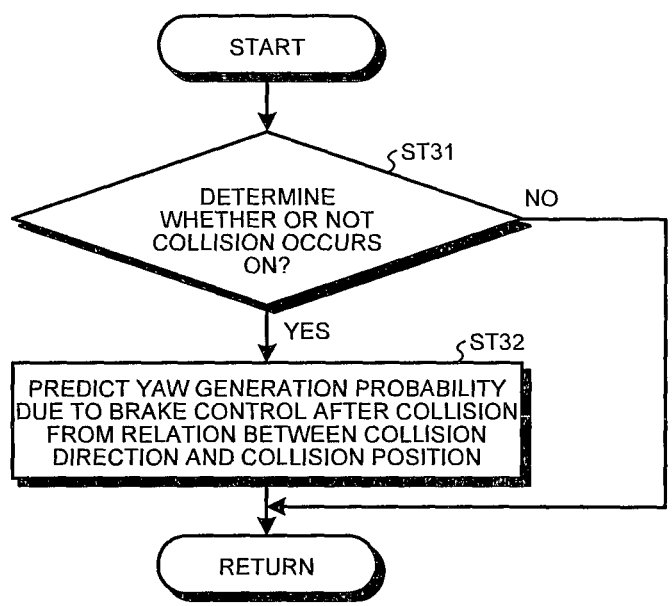
FIG. 7 is a flowchart illustrating another example of the brake control suppression process after collision carried out by the vehicle control apparatus according to the embodiment.
Figure 8:
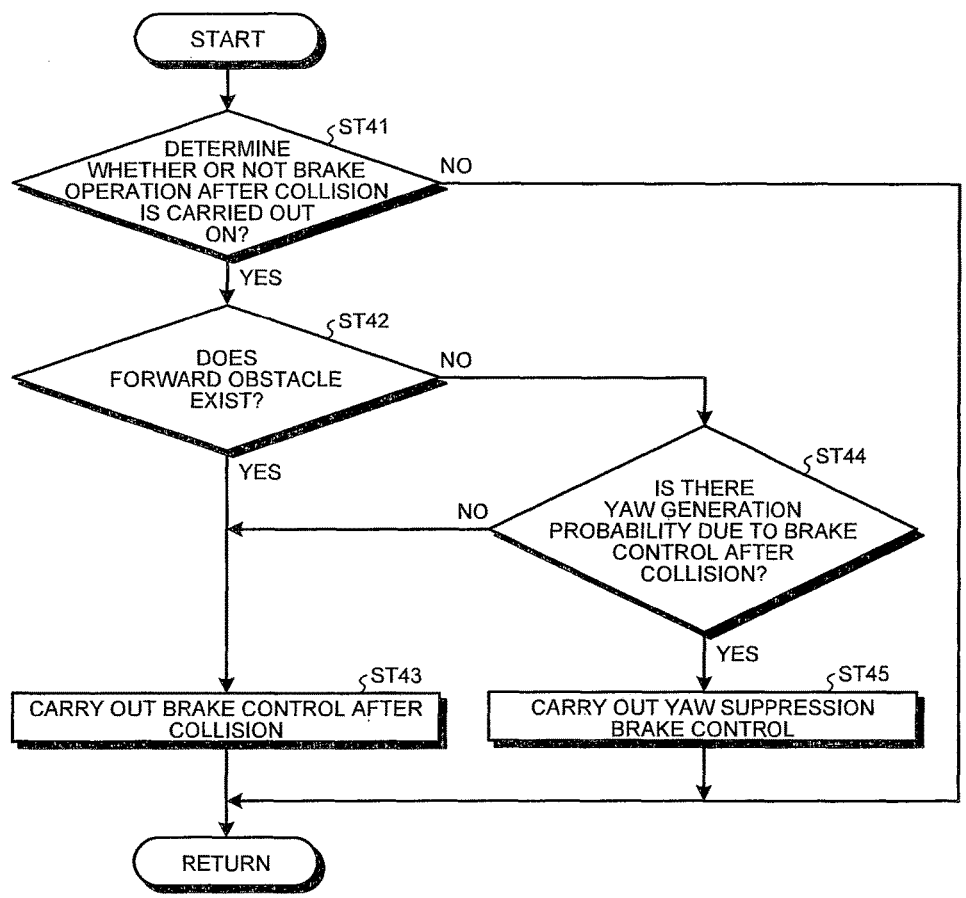
FIG. 8 is a flowchart illustrating another example of the brake control suppression process after collision carried out by the vehicle control apparatus according to the embodiment.

FIG. 2 is a schematic configuration view illustrating a vehicle control apparatus according to an embodiment. FIG. 3 is a view illustrating an example of a collision direction and a collision position of a vehicle according to the embodiment with respect to an object outside the vehicle. FIG. 4 is a table illustrating a list of the combinations of collision directions and collision positions where yaw tends to be generated by a brake control after collision (i.e., post-collision brake control) according to the embodiment. FIG. 5 and FIG. 6 are flowcharts illustrating examples of a brake control suppression process after collision carried out by the vehicle control apparatus according to the embodiment. FIG. 7 and FIG. 8 are flowcharts illustrating other examples of the brake control suppression process after collision carried out by the vehicle control apparatus according to the embodiment.

As illustrated in FIG. 2, a vehicle control apparatus 1 according to the embodiment is mounted on a vehicle 2 as a driver's own vehicle. The vehicle control apparatus 1 predicts a yaw generation probability that is a degree of generation of yaw generated by a brake control after collision of the vehicle 2 and controls the vehicle 2 based on the predicted yaw generation probability. The vehicle control apparatus 1 of the embodiment is achieved by mounting the components illustrated in FIG. 2 on the vehicle 2.

Specifically, as illustrated in FIG. 2, the vehicle control apparatus 1 of the embodiment includes wheel speed sensors 3, a G sensor 4, a forward recognition sensor 5, a brake actuator 6, and a brake ECU 7.

The wheel speed sensors 3 are disposed to respective wheels 8 (a front right wheel, a front left wheel, a rear right wheel, and a rear left wheel) of the vehicle 2, respectively and detect the wheel speeds that are the rotation speeds of the respective wheels 8. The respective wheel speed sensors 3 are electrically connected to the brake ECU 7 and output the detected wheel speed signals of the respective wheels 8 to the brake ECU 7. Note that, hereinafter, the respective wheels 8 of the vehicle 2, i.e. the front right wheel, the front left wheel, the rear right wheel, and the rear left wheel may be called an FR wheel, an FL wheel, an RR wheel, and an RL wheel, respectively.

The G sensor 4 detects the acceleration (hereinafter, may be called "vehicle acceleration") acting on the vehicle 2. The G sensor 4 detects, for example, the vehicle acceleration acting along the front-back direction of the vehicle 2 and the vehicle acceleration acting along the vehicle width direction orthogonal to the front-back direction (hereinafter, may be called "right-left direction"). The G sensor 4 is electrically connected to the brake ECU 7 and outputs the detected acceleration signal to the brake ECU 7. In the embodiment, the G sensor 4 has a function as a collision detection means for detecting that vehicle 2 has collided against an object outside the vehicle.

The forward recognition sensor 5 recognizes the state in a peripheral region forward of the vehicle 2. The forward recognition sensor 5 may use any of, for example, a periphery monitor CCD camera (image pick-up device) and its image recognition device, a millimeter wave radar, a radar using infrared rays, etc., a laser radar using a laser beam, a short distance radar such as a UWB (Ultra Wide Band) radar, etc., a sonar using an audible range sound wave or an ultrasonic wave, etc.

The brake actuator 6 configures a brake device mounted on the vehicle 2 and is an actuator for generating a brake force to the respective wheels 8 of the vehicle 2. Although the brake actuator 6 is typically an electronically controlled brake device (Electronically Controlled Brake), the brake actuator 6 may be an actuator of a device for generating a brake force to the respective wheels 8 of the vehicle 2 by, for example, a parking brake and an engine brake. The brake actuator 6 can decelerate the vehicle 2 by automatically generating a brake force under the control of the brake ECU 7 without depending on the drive of a driver.

The brake ECU 7 controls the drive of the brake actuator 6 and is configured including an electronic circuit mainly composed of a known microcomputer having a CPU, a ROM, a RAM, and an interface. The brake ECU 7 is electrically connected with various sensors such as the wheel speed sensors 3, the G sensor 4, the forward recognition sensor 5, etc. and the various detectors described above and outputs a drive signal to the brake actuator 6. The brake ECU 7 carries out a stored control program based on the various input signals and the various maps input from the various sensors and detectors, etc. thereby controlling the drive of the brake actuator 6 by outputting the drive signal to the brake actuator 6.

In the embodiment, the brake actuator 6 and the brake ECU 7 described above have a function as a brake control means for carrying out, when the collision detection means detects a collision, a brake control after collision for automatically braking the vehicle 2. The brake control after collision is a control for controlling the brake actuator 6 when the vehicle 2 has collided against an object outside the vehicle 2 and automatically decelerating the vehicle 2. When the collision of the vehicle 2 has been detected, the brake ECU 7 carries out the brake control after collision for controlling the brake actuator 6 and automatically decelerating the vehicle 2. The brake ECU 7 can detect that the vehicle 2 has collided against the object outside the vehicle 2, i.e. the collision of the vehicle 2 based on, for example, the vehicle acceleration, etc. detected by the G sensor 4. With the operation, when, for example, a primary collision occurs in the vehicle 2, the vehicle control apparatus 1 reduces the motion energy of the vehicle 2 to avoid an additional secondary collision after the primary collision, thereby guiding an occupant safely.

When a brake system fails after a collision occurs, a yaw moment may be generated by carrying out the brake control after collision depending on a collision position and a failure portion. In the case, a probability that an amount of lateral movement of the vehicle 2 becomes high after the collision occurs, and when the amount of lateral movement of the vehicle increases, there is a fear that the probability of secondary collision against a road side object and an oncoming vehicle becomes high due to a deviation of the vehicle outside a road.

Thus, the brake ECU 7 of the embodiment further includes a function as a prediction means for predicting the yaw generation probability that is a degree of generation of yaw generated to the vehicle 2 when the brake control after collision is carried out based on the collision direction and the collision position of the vehicle 2 with respect to an object outside the vehicle after the collision has been detected by the collision detection means and before the brake control after collision is carried out by the brake control means. Specifically, the prediction means predicts a failed wheel that may not be braked from a combination of the collision direction and the collision position of the vehicle 2 to the object outside the vehicle and predicts whether or not the yaw generation probability occurs according to the position of the failed wheel having been predicted.

Whether or not the yaw generation probability occurs will be explained according to the position of the failed wheel that may not be braked referring to FIG. 3 and FIG. 4. Note that, in the example of FIG. 3 and FIG. 4, it is assumed that the wheels to be steered of the vehicle 2 are kept in a linear travel direction along the front-back direction of the vehicle 2.

As illustrated in FIG. 3, when largely classified, for example, the front-back direction of the vehicle 2 and the right-left direction orthogonal to the front-back direction are exemplified as the collision directions of the vehicle 2 according to the embodiment to the object outside the vehicle. Further, as the collision positions of the vehicle 2 according to the embodiment to the object outside the vehicle, for example, positions 1 to 8, at which the respective wheels 8 of the vehicle 2 (FR wheel, FL wheel, RR wheel, RL wheel) may be failed in collision, are exemplified. In FIG. 3, the position 1 and the position 2 are positions in the periphery of the FR wheel of the vehicle 2. The position 1 is a right position of the front surface of the vehicle 2, and the position 2 is a front right position of a side surface of the vehicle 2. The position 3 and the position 4 are positions in the periphery of the RR wheel of the vehicle 2. The position 3 is a rear right position of the side surface of the vehicle 2, and the position 4 is a right position of the rear surface of the vehicle 2. The position 5 and the position 6 are positions in the periphery of RL wheel of the vehicle 2. The position 5 is a left position of the rear surface of the vehicle 2, and the position 6 is a rear left position of a side surface of the vehicle 2. The position 7 and the position 8 are positions in the periphery of the FL wheel of the vehicle 2. The position 7 is a front left position of the side surface of the vehicle 2, and the position 8 is a left position of the front surface of the vehicle 2.

FIG. 4 is a list illustrating the combinations of the failed wheels that may not be braked due to a failure of the brake system occurred in collision and whether or not the yaw generation probability occurs due to the brake control after collision. The combinations of the failed wheels can be predicted by the prediction means from the combinations of the positions 1 to 8 as the collision positions and the front-back direction and the right-left direction as the collision directions exemplified in FIG. 3, and the yaw generation probability can be predicted by the prediction described above. In FIG. 4, when the collision position is the position 1 and the collision direction is the front-back direction, since the FR wheel may become a failed wheel, when the brake control after collision is carried out in the state, yaw is generated in a counterclockwise direction because braking is carried out in a right/left asymmetric state. Thus, in the case, it is predicted that the yaw generation probability occurs due to the brake control after collision. Further, also when the collision position is the position 1 and the collision direction is the front-back direction and the vehicle 2 has a brake system with an X-shaped two-piping system, the FR wheel and the RL wheel may become the failed wheels. When the brake control after collision is carried out in the state, yaw is generated in the counterclockwise direction because braking is carried out in the right/left asymmetric state. Thus, also in the case, it is predicted that the yaw generation probability occurs due to the brake control after collision. Note that when collision position is the position 1 and the collision direction is the front-back direction and the vehicle 2 has a brake system of a front/back two systems, the FR wheel and the FL wheel may become failed wheels. When the brake control after collision is carried out in the state, no yaw is generated because braking is carried out in a bilaterally symmetrical state. Thus, in the case, it is predicted that the yaw generation probability does not occur due to the brake control after collision. Note that a detailed explanation will be omitted as to the cases illustrated in the example of FIG. 4 that the collision position is the position 2 and the collision direction is the right-left direction, the collision position is the position 3 and the collision direction is the right-left direction, the collision position is the position 4 and the collision direction is the front-back direction, the collision position is the position 5 and the collision direction is the front-back direction, the collision position is the position 6 and the collision direction is the right-left direction, the collision position is the position 7 and the collision direction is the right-left direction, and the collision position is the position 8 and the collision direction is the front-back direction. However, as illustrated in FIG. 4, the prediction means predicts whether or not the yaw generation probability occurs due to the brake control after collision according to the combinations of the failed wheels that may not be braked by the failure of the brake system generated when the collision occurs.

In the embodiment, when the yaw generation probability predicted by the prediction means is high, the brake control means described above suppresses to carry out the brake control after collision in comparison with a case that the yaw generation probability is low, thereby reducing the probability of generation of yaw due to the brake control after collision. Specifically, when the yaw generation probability is not predicted by the prediction means, the brake control means carries out the brake control after collision, whereas when the yaw generation probability is predicted by the prediction means, the brake control means prohibits the brake control after collision without carrying out the brake control after collision. In addition to what has been described above, when the yaw generation probability is not predicted by the prediction means, the brake control means may carry out the brake control after collision, whereas when the yaw generation probability is predicted by the prediction means, the brake control means may carry out a yaw suppression brake control for automatically braking the vehicle by generating a brake force smaller than the brake force generated by the brake control after collision. In the yaw suppression brake control, for example, a brake control time may be reduced to generate the brake force smaller than the brake force generated by the brake control after collision, the brake control may be carried out at plural steps in time series, or the brake control may be carried out so that a yaw rate value becomes small according to an actual yaw rate value.

Subsequently, an example of the process carried out in the vehicle control apparatus 1 according to the embodiment will be explained referring to the flowcharts of FIG. 5 to FIG. 8. Note that the control routines are repeatedly carried out at a control cycle of several milliseconds to several tens of milliseconds (this is the same in the following explanations).

First, referring to FIG. 5 and FIG. 6, as an example of carrying out a brake control suppression process after collision carried out by the brake ECU 7, a process for carrying out the brake control after collision when the yaw generation probability does not occur and prohibiting the brake control after collision without carrying out the brake control after collision when the yaw generation probability occurs will be explained in detail. In the embodiment, the brake control suppression process after collision means a process for suppressing to carry out the brake control after collision when the yaw generation probability is high in comparison with the case that the yaw generation probability is low.

As illustrated in FIG. 5, the brake ECU 7 determines whether or not a result of collision determination is ON (step ST11). At step ST11, the brake ECU 7 determines whether or not a collision occurs from the value of the G sensor 4 having the function as the collision detection means for detecting that the vehicle 2 has collided against the object outside the vehicle. For example, the brake ECU 7 determines whether or not the detected value of the vehicle acceleration detected by the G sensor 4 is equal to or larger than a preset threshold value. When the detected value of the vehicle acceleration is equal to or larger than the threshold value, the brake ECU 7 determines that collision occurs and determines that the result of collision determination is ON. In contrast, when the detected value of the vehicle acceleration is smaller than threshold value, the brake ECU 7 determines that the collision does not occur and determines that the result of collision determination is OFF. In addition to what has been described above, the brake ECU 7 may determine whether or not the collision occurs from a development signal of an airbag (not illustrated) disposed to the vehicle control apparatus 1, etc. In the case, when the development signal of the airbag is detected, the brake ECU 7 determines that the collision occurs and determines that the result of collision determination is ON. In contrast, when the development signal of the airbag is not detected, the brake ECU 7 determines that the collision does not occur and determines that the result of collision determination is OFF. Further, when the brake ECU 7 determines that the result of collision determination is ON at step ST11, the ECU 7 detects the collision direction and the collision position of the object outside the vehicle 2 based on the vehicle acceleration detected by the G sensor 4 and the development signal of the airbag, etc.

When the brake ECU 7 determines at step ST11 that the result of collision determination is ON (step ST11: Yes), the brake ECU 7 goes to the process at step ST12. Then, the brake ECU 7 determines whether or not an obstacle exists forward of the vehicle 2 based on the result of recognition, which is recognized by the forward recognition sensor 5, as to the state of the peripheral region forward of the vehicle 2 (step ST12). In contrast, when the brake ECU 7 determines at step ST11 that the result of collision determination is OFF (step ST11: No), the brake ECU 7 goes to the process at step ST16. Then, the brake ECU 7 sets a permission flag which shows that it is permitted to carry out the brake control after collision (step ST16). Thereafter, the brake ECU 7 returns from the process.

When the brake ECU 7 determines at step ST12 that the obstacle does not exists forward of the vehicle 2 (step ST12: Yes), the ECU 7 goes to the process at step ST13. Then, the brake ECU 7 predicts the yaw generation probability that is generated due to the brake control after collision from the relation between the collision direction and the collision position detected when "Yes" is determined at step ST11 (step ST13). As illustrated in FIG. 3 and FIG. 4 described above, for example, the brake ECU 7 predicts the yaw generation probability that is the degree of generation of yaw generated to the vehicle 2 when the brake control after collision is carried out based on the collision direction and the collision position of the vehicle 2 with respect to the object outside the vehicle. Specifically, the brake ECU 7 predicts the failed wheel that may not be braked from the combination of the collision direction and the collision position of the vehicle 2 with respect to the object outside the vehicle and determines whether or not the yaw generation probability occurs according to the position of the failed wheel having been predicted. Then, the brake ECU 7 determines whether or not the yaw generation probability occurs due to the brake control after collision based on the result of prediction at step ST13 (step ST14).

When the brake ECU 7 determines at step ST14 that the yaw generation probability occurs due to the brake control after collision, (step ST14: Yes), the brake ECU 7 goes to the process at step ST15. Then, the brake ECU 7 sets a prohibition flag which shows that it is prohibited to carry out the brake control after collision (step ST15). Thereafter, the brake ECU 7 returns from the process.

Note that, when the brake ECU 7 determines at step ST12 described above that the obstacle exists forward of the vehicle 2 (step ST12: No) and determines at step ST14 described above that the yaw generation probability does not occur due to the brake control after collision (step ST14: No), the brake ECU 7 goes to the process at ST16 likewise at the time of determination at step ST11: No, sets the permission flag which shows that it is permitted to carry out the brake control after collision, and thereafter returns from the process. In the process explained next in FIG. 6, the brake ECU 7 determines whether or not the brake control after collision is carried based on the permission flag or the prohibition flag set in the process of FIG. 5 in consideration that the brake control after collision is permitted or prohibited.

As illustrated in FIG. 6, the brake ECU 7 determines whether or not the result of collision determination is ON (step ST21). When the brake ECU 7 determines at step ST21 that the result of collision determination is ON (step ST21: Yes), the brake ECU 7 goes to the process at step ST22. Then, the brake ECU 7 determines whether or not the brake control after collision is permitted by determining a type of the flag set by the process of FIG. 5 (step ST22). Specifically, when the brake ECU 7 determines at step ST22 that the type of the flag set in the process of FIG. 5 is the permission flag, the ECU 7 determines that the brake control after collision is permitted, whereas when the ECU 7 determines that the type of the flag is the prohibition flag, the ECU 7 determines that the brake control after collision is prohibited. In contrast, when the brake ECU 7 determines at step ST21 that the result of collision determination is OFF (step ST21: No), the brake ECU 7 returns from the process.

When the brake ECU 7 determines at step ST22 that the brake control after collision is permitted (step ST22: Yes), the brake ECU 7 determines whether or not the brake system, i.e. the brake device of the vehicle 2 including the brake actuator 6 fails (step ST23). The brake ECU 7 determines whether or not the brake system fails according to the various input signals input from the various sensors and the detectors, etc. and the operating state of the brake actuator 6, etc. In contrast, when the brake ECU 7 determines at step ST22 that the brake control after collision is not permitted, i.e. the brake control after collision is prohibited (step ST22: No), the ECU 7 returns from the process.

When the brake ECU 7 determines at step ST23 that the brake system does not fail (step ST23: Yes), the ECU 7 goes to the process at step ST24. Then, the brake ECU 7 determines whether or not the vehicle speed of the vehicle 2 based on the wheel speeds detected by the wheel speed sensors 3 is larger than a preset predetermined value (step ST24). The predetermined value is set to a value of, for example, about 10 km to 20 km per hour. In contrast, when the brake ECU 7 determines at step ST23 that the brake system fails (step ST23: No), the ECU 7 returns from the process.

When the brake ECU 7 determines at step ST24 that the vehicle speed is larger than the predetermined value (step ST24: Yes) and detects a collision, the ECU 7 carries out the brake control after collision for automatically braking the vehicle 2 (step ST25). Note that, when the vehicle speed reduces up to 0 km per hour, the brake control after collision is suspended. In contrast, when the brake ECU 7 determines at step ST24 that the vehicle speed is equal to or smaller than the predetermined value (step ST24: No), the ECU 7 returns from the process.

Next, referring to FIG. 7 and FIG. 8, as another example of the brake control suppression process after collision carried out by the brake ECU 7, a process will be explained in detail, the process carrying out the brake control after collision when the yaw generation probability does not occur and carrying out the yaw suppression brake control automatically braking the vehicle 2 by generating the brake force smaller than the brake force generated by the brake control after collision when the yaw generation probability occurs.

As illustrated in FIG. 7, the brake ECU 7 determines whether or not the result of collision determination is ON (step ST31). When the brake ECU 7 determines at step ST31 that the result of collision determination is ON (step ST31: Yes), the ECU 7 goes to the process at step ST32. Then, the brake ECU 7 predicts the yaw generation probability due to the brake control after collision from the relation between the collision direction and the collision position detected when "Yes" is determined at step ST 31 (step ST32). Thereafter, the brake ECU 7 returns from the process. In contrast, when the brake ECU 7 determines at step ST31 that the result of collision determination is OFF (step ST31: No), the ECU 7 returns from the process. In the process of FIG. 8 explained next, the brake ECU 7 determines whether the brake control after collision is to be carried out or the yaw suppression brake control is to be carried out using the yaw generation probability predicted by the process FIG. 7, etc.

As illustrated in FIG. 8, the brake ECU 7 determines whether or not a result of determination of a brake operation after collision is ON (step ST41). The brake ECU 7 determines whether or not a preset operating condition of the brake control after collision is satisfied by, for example, whether or not a collision occurs, a vehicle speed after collision, and whether or not the brake control can be carried out, etc. When the operating condition of the brake control after collision is satisfied, the brake ECU 7 determines that the result of determination of the brake operation after collision is ON, whereas when the operating condition of the brake control after collision is not satisfied, the ECU 7 determines that the result of determination of the brake operation after collision is OFF.

When the brake ECU 7 determines at step ST41 that the result of determination of the brake operation after collision is ON (step ST41: Yes), the ECU 7 goes to the process at step ST42. Then, the brake ECU 7 determines whether or not an obstacle exits forward of the vehicle 2 based on the result of recognition, which is recognized by the forward recognition sensor 5, as to the state of the peripheral region forward of the vehicle 2 (step ST42). In contrast, when the brake ECU 7 determines at step ST41 that the result of determination of the brake operation after collision is OFF (step ST41: No), the ECU 7 returns from the process.

When the brake ECU 7 determines at step ST42 that the obstacle exists forward of the vehicle 2 (step ST42: Yes), since it is necessary to carry out the brake control for reducing a damage due to the collision between the vehicle 2 and the forward obstacle, the brake ECU 7 carries out the brake control after collision (step ST43). At step ST43, the brake ECU 7 carries out the brake control after collision to reduce the motion energy of the vehicle 2 after collision against the forward obstacle or avoid the collision against the obstacle ahead. Thereafter, the brake ECU 7 returns from the process. In contrast, when the brake ECU 7 determines at step ST42 that the obstacle does not exist forward of the vehicle 2 (step ST42: No), the ECU 7 determines whether or not the yaw generation probability occurs due to the brake control after collision based on the result of prediction at step ST32 of FIG. 7 (step ST44).

When the brake ECU 7 determines at step ST44 that the yaw generation probability does not occur due to the brake control after collision (step ST44: No), the ECU 7 goes to the process at step ST43 and carries out the brake control after collision. In contrast, when the brake ECU 7 determines at step ST44 that the yaw generation probability occurs due to the brake control after collision (step ST44: Yes), the ECU 7 carries out the yaw suppression brake control for automatically braking the vehicle 2 by generating the brake force smaller than the brake force generated by the brake control after collision (step ST45). When the forward obstacle does not exist at step S45, since the vehicle 2 deviates from its lane due to yaw generated by the brake control after collision and the probability of a secondary collision becomes high, the ECU 7 carries out the yaw suppression brake control. For example, the brake ECU 7 may carry out the brake control so that the yaw rate value becomes small according to the actual yaw rate value as the yaw suppression brake control. Thereafter, the brake ECU 7 returns from the process.

As described above, when the predicted yaw generation probability is high, the vehicle control apparatus 1 according to the embodiment can suppress to carry out the brake control after collision in comparison with the case that the yaw generation probability is low. With the configuration, according to the vehicle control apparatus 1 of the embodiment, since the probability that yaw is generated by the brake control after collision can be reduced, the probability of the secondary collision against a road side object and an oncoming vehicle due to the deviation of the vehicle outside a road in which the vehicle travels beyond its lane can be also suppressed. As a result, a safety can be improved when the brake control is carried out.

Note that the vehicle control apparatus 1 according to the embodiment of the disclosure described above is not restricted to the embodiment described above and can be variously changed in the scope set forth in the claims.

The invention claimed is:

1. A vehicle control apparatus comprising:
a collision detection unit configured to detect that a vehicle collides against an object outside the vehicle;
a brake control unit configured to carry out a post-collision brake control for automatically braking the vehicle when the collision detection unit detects the collision; and
a prediction unit configured to predict a yaw generation probability which is a degree of generation of yaw generated to the vehicle when the post-collision brake control is carried out, based on a collision direction and a collision position of the vehicle with respect to the object outside the vehicle, after the collision has been detected by the collision detection unit and before the post-collision brake control is carried out by the brake control unit,
wherein, when the yaw generation probability predicted by the prediction unit is high, the brake control unit suppresses to carry out the post-collision brake control in comparison with a case that the yaw generation probability is low.

2. The vehicle control apparatus according to claim 1, wherein the prediction unit predicts a failed wheel which may not be braked from a combination of the collision direction and the collision position of the vehicle with respect to the object outside the vehicle, and predicts whether or not the yaw generation probability occurs according to a position of the failed wheel having been predicted.

3. The vehicle control apparatus according to claim 2, wherein:
when the yaw generation probability is not predicted by the prediction unit, the brake control unit carries out the post-collision brake control, and
when the yaw generation probability is predicted by the prediction unit, the brake control unit prohibits the post-collision brake control without carrying out the post-collision brake control.

4. The vehicle control apparatus according to claim 2, wherein:
when the yaw generation probability is not predicted by the prediction unit, the brake control unit carries out the post-collision brake control, and
when the yaw generation probability is predicted by the prediction unit, the brake control unit carries out a yaw suppression brake control for automatically braking the vehicle by generating a brake force smaller than the brake force generated by the post-collision brake control.

* * * * *